UNITED STATES PATENT OFFICE.

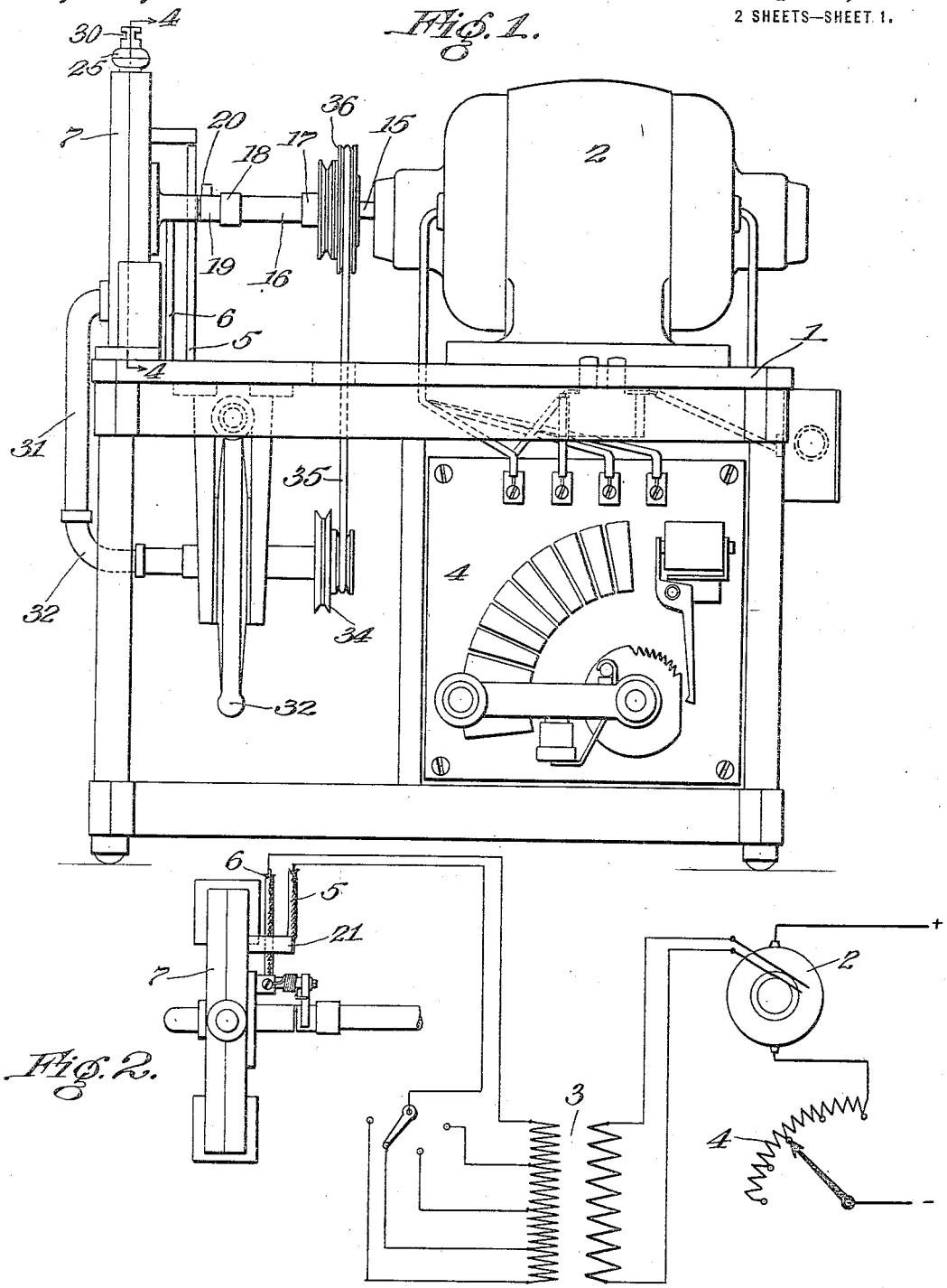

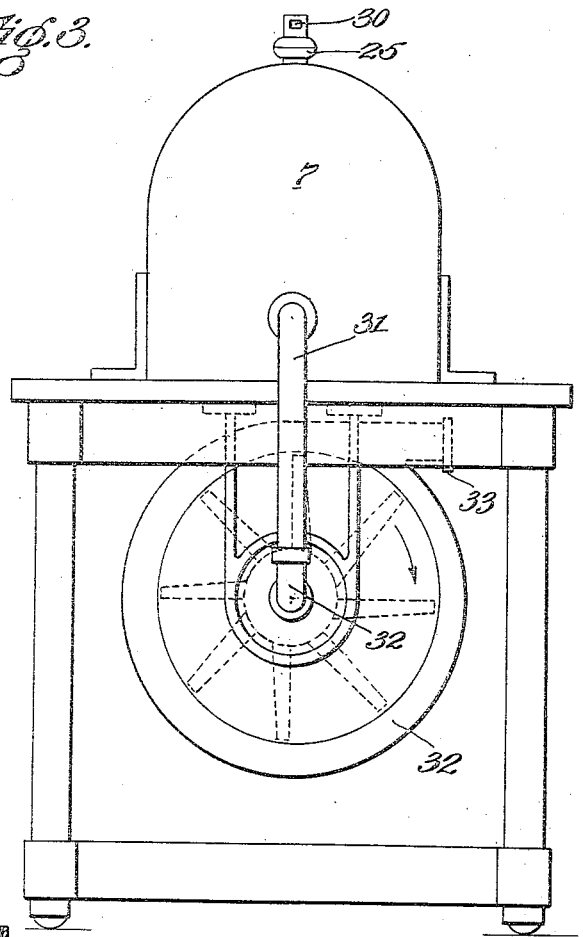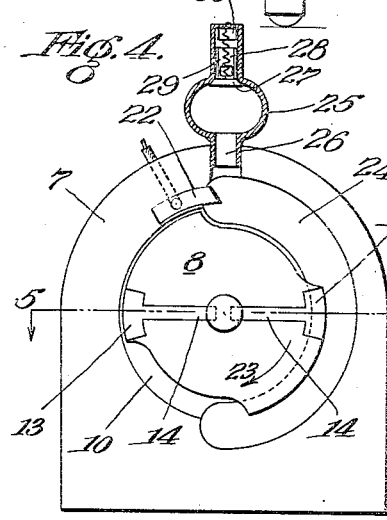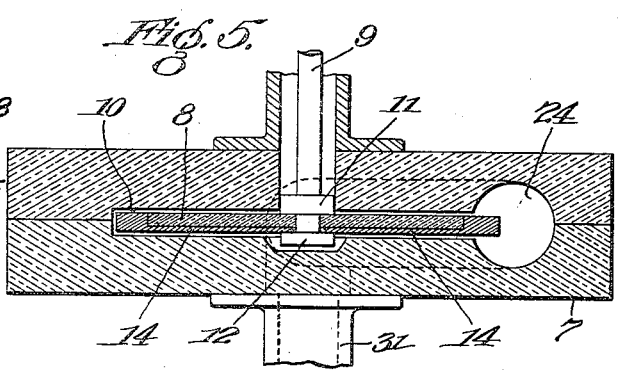

RUDOLF ROSNER, OF CHICAGO, ILLINOIS.

ELECTRIC GAS-GENERATOR.

1,374,237.  Specification of Letters Patent.  Patented Apr. 12, 1921.

Application filed June 17, 1920. Serial No. 389,684.

*To all whom it may concern:*

Be it known that I, RUDOLF ROSNER, a citizen of the United States, residing in the city of Chicago, in the county of Cook and State of Illinois, have invented certain new and useful Improvements in Electric Gas-Generators, of which the following is a specification, reference being had to the accompanying drawings, forming a part thereof.

The purpose of this invention is to provide an apparatus for generating by electric means a gas having a capacity for killing germs, such as the germs causing tuberculosis and pneumonia, without injuring the tissues of the human body when applied thereto. It consists of the combination of elements and certain features thereof hereinafter described and shown in the drawings as indicated by the claims.

In the drawings:

Figure 1 is a front elevation of an apparatus embodying this invention.

Fig. 2 is a detail plan view of the gas generating unit, together with a wiring diagram indicating the electric connections thereto.

Fig. 3 is an end elevation of the apparatus shown in Fig. 1.

Fig. 4 is a vertical sectional view taken as indicated at line 4—4 on Fig. 1.

Fig. 5 is a transverse section taken as indicated at line 5—5 on Fig. 4.

As illustrated in the drawings, the apparatus is assembled and mounted upon a supporting stand or table, 1, and includes a rotary converter 2, which is in effect a combined motor and generator adapted to be operated by an ordinary commercial current such as is commonly provided for household lighting purposes,—say, direct current of 100 volts. The armature carries also a winding which renders the machine a generator adapted to deliver alternating current of moderate voltage. As indicated by the wiring diagram in Fig. 2, this generator is connected to a transformer, 3, adapted to step up the voltage to a comparatively high value, so as to deliver an alternating current of high potential. The rotary converter, 2, is provided with a controller, 3, for modifying its speed to secure the desired frequency and voltage in the alternating current.

From the transformer, 3, the two high potential lead wires, 5 and 6, extend through the gas generating unit, which comprises a two-part casing, 7, of incombustible dielectric material,—for example, a molded composition of asbestos,—and a rotor, 8, which consists of a disk of similar incombustible dielectric material, rotatively carried by a shaft, 9, in the cavity, 10, of the casing, 7, in which cavity the disk is dimensioned to be a fair running fit. The disk, 8, is secured on the shaft, 9, between a flange or collar, 11, and a terminal flange or head, 12, as shown in Fig. 5, and set into the peripheral portion of the disk, are one or more metallic electrodes, 13,—the drawing showing two such electrodes are connected by flat radial arms, 14, with the shaft, 9, said arms lapping under the terminal flanges, 12, of said shaft. To prevent the arms, 14, from buckling or deforming on increase of temperature, their end portions under the head, 12, do not reach quite up to the reduced portion of the shaft, 9, but stop short of the shaft far enough to allow for such expansion as may be expected under change of temperature in operation of the apparatus.

The shaft, 9, is connected to the shaft, 15, of the rotary converter, 2, by an end coupling, 16, of dielectric material of high resistance, engaging coupling sockets, 17 and 18, on the shafts, 15 and 9, respectively. Adjacent the sockets, 18, the shaft, 9, carries a conducting collar, 19, running in contact with a transmitting brush, 20, to which the high potential lead wire, 6, is connected. Thus, through the shaft, 9, and radial conducting arms, 14, the electrodes, 13, on the disk, 8, are continuously connected to one side of the high potential circuit. The other wire, 5, as shown in Figs. 1 and 2, extends to a connection post, 21, projected through the casing, 7, from a fixed electrode, 22, mounted therein, adjacent the path of rotation of the electrode, 13, on the disk, 8.

It may be understood that, when the shaft, 9, is rotated by the operation of the rotary converter, 2, the high potential alternating current in the circuit just described, produces a charge of static electricity on the electrodes, 13, resulting in a static discharge as each electrode, 13, approaches and passes the fixed electrode, 22, and immediately following this discharge of static electricity, as the electrode, 13, rotating in the direction of the arrow, 23, moves away from the fixed electrode, 22, a dynamic discharge in the form of a spark is drawn out into a white flame for some distance through the chamber, 24, which is formed as an enlargement of the cavity, 10, adjacent a portion of the path of the electrode, QE, and extending from the electrode, 22, partway around the circle, which constitutes their path. At an end of the chamber, 24, which is adjacent the electrode, 22, the casing, 7, is provided with an air inlet valve fitting, 25, having an inlet passage, 26, and a valve, 27, adapted to control admission of air through the passage, 26, and to open toward said passage in opposition to a spring, 28, tending to hold the valve closed. As shown in Fig. 4, the valve is formed with a hollow cylindrical guide stem, 29, and the upper portion of the fitting, 25, is provided with inlet ports, 30, through which atmospheric air is admitted to the chamber, 24, when the valve, 27, is open.

At the farther end of the arcuate chamber, 24, an outlet port connects with a pipe or conduit, 31, leading downwardly as shown in Figs. 1 and 3, for connection with an exhaust blower or suction fan, 32, which may be of any suitable design, such, for example, as that shown in my copending application, Serial No. 353,467, and preferably, to avoid the accumulation of a static electric charge upon said suction fan, or other electrical complication, an elbow, 2, of dielectric material is made a part of the air conduit, 31. The discharge opening of the fan or blower, 32, is indicated in Fig. 1 and Fig. 3, at 33, and it may be understood that at this point any convenient form of gas-conducting hose with a suitable nozzle may be attached. The suction fan, 32, is provided with a drive pulley, 34, and is conveniently driven through a belt, 35, traversing a pulley, 36, on the shaft, 15, of the rotary converter, 2, so that the motor element of said converter serves the triple function of driving the generator winding, driving the gas generating unit with its dielectric disk, 8, and driving the suction fan, 32.

The operation of the suction fan, 32, draws air past the inlet valve, 27, through the opening, 26, into the gas generating chamber, 24. As a result of static discharge between electrodes, 13 and 22, a part of this air is converted into ozone, but in the immediately succeeding dynamic discharge, this ozone recombines with the oxygen and nitrogen of the air in the white heat of the electric flame to form a new gas of whose chemical composition I am not perfectly certain; but which experiment has shown has the property of killing certain germs, such as those causing tuberculosis and pneumonia, while it does not have any serious effect on the tissues of the human body with which it comes in contact. The gas thus electrically generated in the chamber, 24, is drawn out of the chamber through the conduit, 31, and exhaust fan, 32, so that by attaching a suitable nozzle to the outlet, 33, this gas can be used in the treatment, either in large or small quantities, as occasion requires.

It may be further stated, that in general an alteration of the frequency or voltage of the high potential current which is furnished to the generating unit, and causes the electrical discharges in the chamber, 24, will modify the quality of the gas produced. As already pointed out, the frequency and voltage can be altered by means of the controller, 4, which serves to vary the speed of the rotary converter, 2, and by adjustment of the transformer in a well understood manner. Furthermore, the particular tension of the spring, 28, will determine the rate at which the air is admitted past the valve, 27, at any given speed of rotation of the suction fan, 32. It will also be understood that I do not confine myself to a single pair of electrodes, 13, as shown, on the dielectic disk, 8, but that any convenient number of such electrodes may be employed according to the size of the machine and the speed of rotation of the disk, 8.

It will be obvious that any organic impurities in the atmospheric air entering through the valve, 27, will be subjected to complete combustion in the white heat of the electric flame in the chamber, 24, so that the gas furnished by the apparatus is thus sterilized. It may also be mentioned that by causing the flow of air through the chamber, 24, by means of a suction fan, and the yieldingly opening valve, 27, instead of forcing the air through the chamber by means of a blower or compressor anterior to the inlet, 26, the flow of air is automatically regulated by the fluctuation of the valve, 27, in a manner responsive to any pulsation produced by the blower mechanism, and at the same time compensating and neutralizing the effect of such pulsation. Thus the gas delivered at the outlet, 33, is free from pulsation or vibration which would otherwise be unpleasantly noticeable if the air-feeding mechanism were not thus governed by the yieldingly seated valve, 27.

I claim:

1. In combination, a rotor of incombustible dielectric material provided with an electrode, an inclosing case for said rotor also formed of incombustible dielectric material and carrying a fixed electrode adjacent the path of travel of the rotor electrode, a source of high potential alternating current connected to the electrodes of the rotor and its casing, the casing having a gas generating chamber extending from the fixed electrode adjacent the path of the rotor electrode to an outlet, with an inlet for admitting air to said chamber at the fixed electrode, and means for turning the rotor in direction to carry its electrode past the fixed electrode and thence through the gas generating chamber.

2. In the combination defined in claim 1, the fixed electrode being spaced from the path of the rotor electrode to form an air gap for discharge of static electricity.

3. In the combination defined in claim 1, the cavity of the casing being formed as a fair running fit for the rotor except as to the gas generating chamber.

4. In the combination defined in claim 1, means for passing air through the gas generating chamber at a predetermined rate.

5. In the combination defined in claim 1, means for moving air through the gas generating chamber comprising a mechanically driven exhaust blower connected to the outlet.

6. In the combination defined in claim 1, means for governing the admission of air to the gas generating chamber in relation to the speed of the rotor.

7. In the combination defined in claim 1, a mechanically driven exhaust blower connected to the outlet for drawing air through the gas generating chamber, said blower and the rotor being geared together, and a spring restrained inlet valve opening toward the inlet of the gas generating chamber to govern admission of air thereto in accordance with the speed of the blower and thus in relation to the speed of the rotor.

8. In the combination defined in claim 1, the rotor comprising a disk rotatably carried by a metallic shaft between flanges thereon, and its electrode comprising a metallic member inset at the periphery of the disk with a conducting arm extending along the face of the disk and under one flange of the shaft, but stopping short of said shaft to provide for expansion upon change of temperature.

9. In the combination defined in claim 1, the means for turning said rotor being an electric motor, and an insulating coupling through which said motor drives said rotor.

10. In the combination defined in claim 1, a mechanically driven exhaust blower connected to the outlet of the gas generating chamber, and a rotary converter for generating the alternating current, the rotor in the casing and the exhaust blower being both geared to said rotary converter to be driven thereby.

11. In the combination defined in claim 1, the peripheral part of the rotor adjacent the trailing end of the electrode thereon being cut back toward the shaft axis to make room for the flame of the high potential dynamic arc drawn out in the chamber as the rotor electrode moves away from the fixed electrode.

12. The method of producing a germicidal gas which consists in subjecting air to the action of a static electric discharge, then passing the resulting ozone and more air through a flaming arc of high potential alternating current and conducting away the resulting gas.

In testimony whereof, I have hereunto set my hand at Chicago, Illinois, this 29th day of May, 1920.

RUDOLF ROSNER.